United States Patent
Kogure

(10) Patent No.: US 6,993,968 B2
(45) Date of Patent: Feb. 7, 2006

(54) LIQUID LEVEL SENSING APPARATUS

(75) Inventor: Yoshihiro Kogure, Gunma (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/014,828

(22) Filed: Dec. 20, 2004

(65) Prior Publication Data
US 2005/0166674 A1 Aug. 4, 2005

(30) Foreign Application Priority Data
Jan. 30, 2004 (JP) ............................. 2004-023316

(51) Int. Cl.
G01F 23/38 (2006.01)
(52) U.S. Cl. .......................................... 73/317; 73/314
(58) Field of Classification Search .................. 73/314
See application file for complete search history.

(56) References Cited

U.S. PATENT DOCUMENTS 625,980 A 5/1899 Murphy
6,915,690 B2 * 7/2005 Okada et al. ............. 73/290 R

FOREIGN PATENT DOCUMENTS

EP 1 450 142 A2 8/2004
JP 2002-206959 A 7/2002

* cited by examiner

Primary Examiner—Hezron Williams
Assistant Examiner—Paul M. West
(74) Attorney, Agent, or Firm—Sughrue Mion, PLLC

(57) ABSTRACT

In a liquid level sensing apparatus, a rotating part is fixed with an arm. The arm is arranged to rotate in accordance with a liquid level. The rotating part is supported rotatably on a bearing portion of a housing. A magnet is housed in the rotating part. A magnetoelectric transducer element fixed to the housing is arranged to perform a magnetic detection to convert an intensity of a magnetic field produced by the magnet to an electric signal. The rotating part is formed with an exposure hole exposing a surface of the magnet. The exposed surface of the magnet is located out of a magnetic circuit subjected to the magnetic detection of the magnetoelectric transducer element.

9 Claims, 6 Drawing Sheets

LIQUID LEVEL SENSING APPARATUS

BACKGROUND OF THE INVENTION

The present invention relates to a liquid level sensing apparatus for sensing a liquid level in a noncontact manner by using a device such as a hall element.

A liquid level sensing apparatus capable of performing such a liquid level sensing is disclosed in Japanese Patent Application Publication No. 2002-206959.

SUMMARY OF THE INVENTION

It is an object of the present invention to provide a liquid level sensing apparatus capable of sensing a liquid level while preventing magnetic foreign matter from causing a deterioration of detection accuracy and a locking of a rotating part.

According to one aspect of the present invention, a liquid level sensing apparatus includes: a housing including a bearing portion; a magnet producing a magnetic field; a magnetoelectric transducer element fixed to the housing and arranged to perform a magnetic detection to convert an intensity of the magnetic field to an electric signal; and a rotating part supported rotatably on the bearing portion, fixed with an arm arranged to rotate in accordance with a liquid level, housing the magnet, and formed with an exposure hole exposing a surface of the magnet, the surface being located out of a magnetic circuit subjected to the magnetic detection of the magnetoelectric transducer element.

The other objects and features of this invention will become understood from the following description with reference to the accompanying drawings.

DETAILED DESCRIPTION OF THE INVENTION

Figure 6:
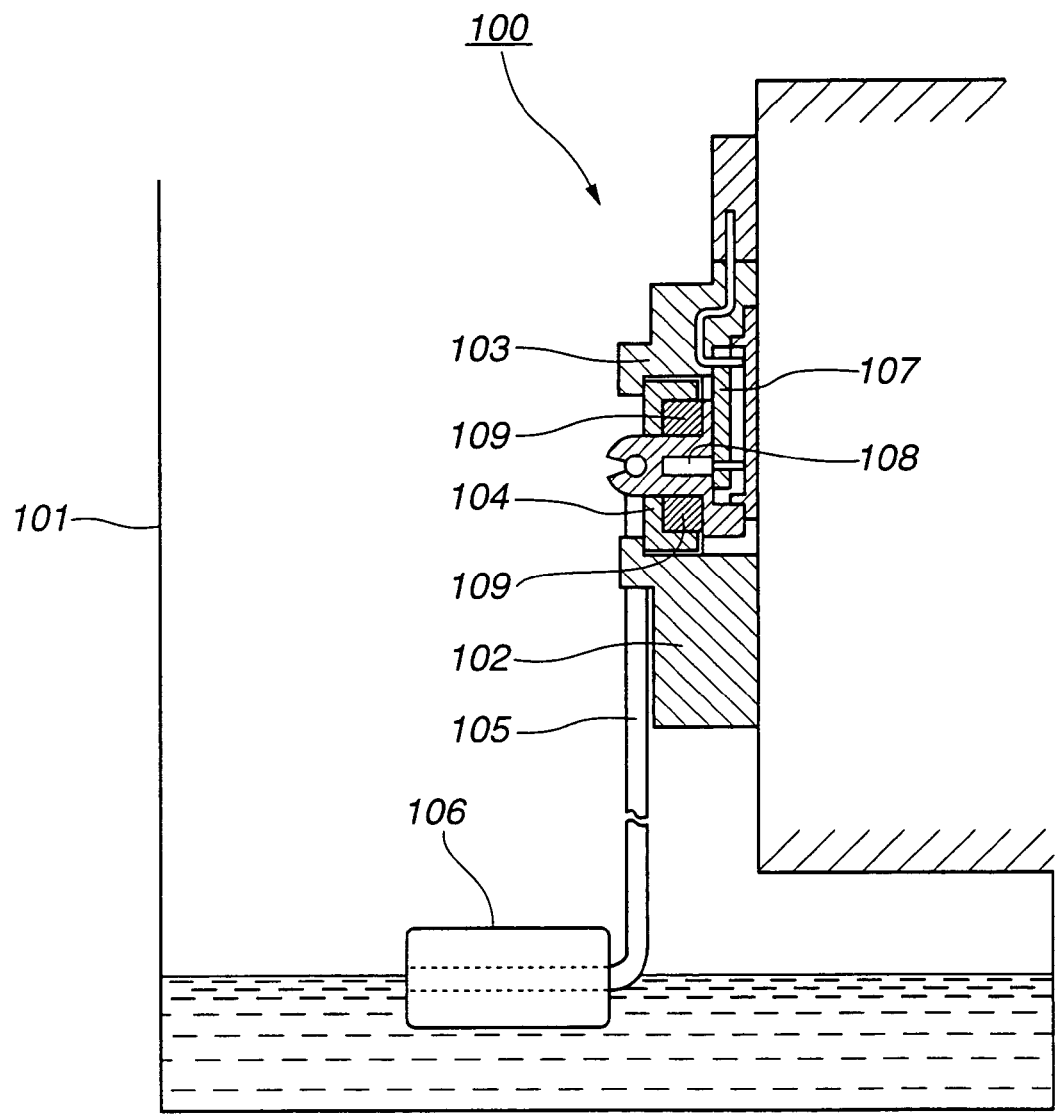
FIG. 6 is a sectional view showing an example of a liquid level sensing apparatus of earlier technology.

First, in order to facilitate understanding of the present invention, a description will be given of a liquid level sensing apparatus of earlier technology. FIG. 6 is a sectional view showing a liquid level sensing apparatus 100 of earlier technology. The liquid level sensing apparatus 100 includes a fixed housing 102, a rotating part 104, an arm 105, a float 106, a wiring board 107, a hall element 108, and a magnet 109. The housing 102 is fixed to an interior surface of a fuel tank 101, and includes a bearing portion 103. The rotating part 104 is supported rotatably on the bearing portion 103. The arm 105 includes a base portion fixed to the rotating part 104, and an end portion attached with the float 106. The hall element 108, which is a magnetoelectric transducer element, is fixed to the housing 102 via the wiring board 107. The hall element 108 is positioned at a center of rotation of the rotating part 104. The magnet 109 has a cylindrical tube form, and is fixed to the rotating part 104 around the center of rotation of the rotating part 104. Thus, the center of the cylindrical tube form of the magnet 109 coincides with the center of rotation of the rotating part 104. The magnet 109 is polarized or magnetized into two poles on opposite sides of a boundary represented by a rotation angle of 180°.

When the float 106 moves up and down in accordance with a liquid level in the fuel tank 101, the movement of the float 106 causes the arm 105 to rotate together with the rotating part 104. Thereby, the magnet 109 rotates with the rotating part 104, and therefore changes directions of a magnetic field produced by the magnet 109. In accordance with the changed directions of the magnetic field, the hall element 108 senses changed intensities of the magnetic field, and outputs an electric signal representing the changed intensities of the magnetic field. Thus, the liquid level sensing apparatus 100 obtains the electric signal in accordance with changes in the liquid level from the hall element 108.

However, magnetic foreign matter, such as magnetic contamination, is dispersed and suspended in the fuel tank 101 as by flowing with a discharge jet of a fuel pump (such magnetic foreign matter hereinafter being referred to simply as "magnetic contamination"). The magnetic contamination is attracted by the magnetic force of the magnet 109, and thereby enters into the above-described liquid level sensing apparatus 100 via clearances between the members of the liquid level sensing apparatus 100.

The magnetic contamination entering into the liquid level sensing apparatus 100 is likely to be deposited on an inner circumferential surface of the magnet 109, because of the clearance between the hall element 108 and the inner circumferential surface of the magnet 109. The magnetic contamination deposited on the inner circumferential surface of the magnet 109 shortens a substantial air gap length between the magnet 109 and the hall element 108, and thereby changes a magnetic flux density transmitted to the hall element 108, which deteriorates a detection accuracy of the hall element 108 to sense an intensity of the magnetic field.

When the magnetic contamination entering into the liquid level sensing apparatus 100 intrudes in between sliding surfaces of the rotating part 104 and the bearing portion 103, the magnetic contamination interferes a smooth rotation of the rotating part 104, and thereby deteriorates the detection accuracy of the liquid level or fuel level, or may possibly cause locking of the rotating part 104.

Figure 1:
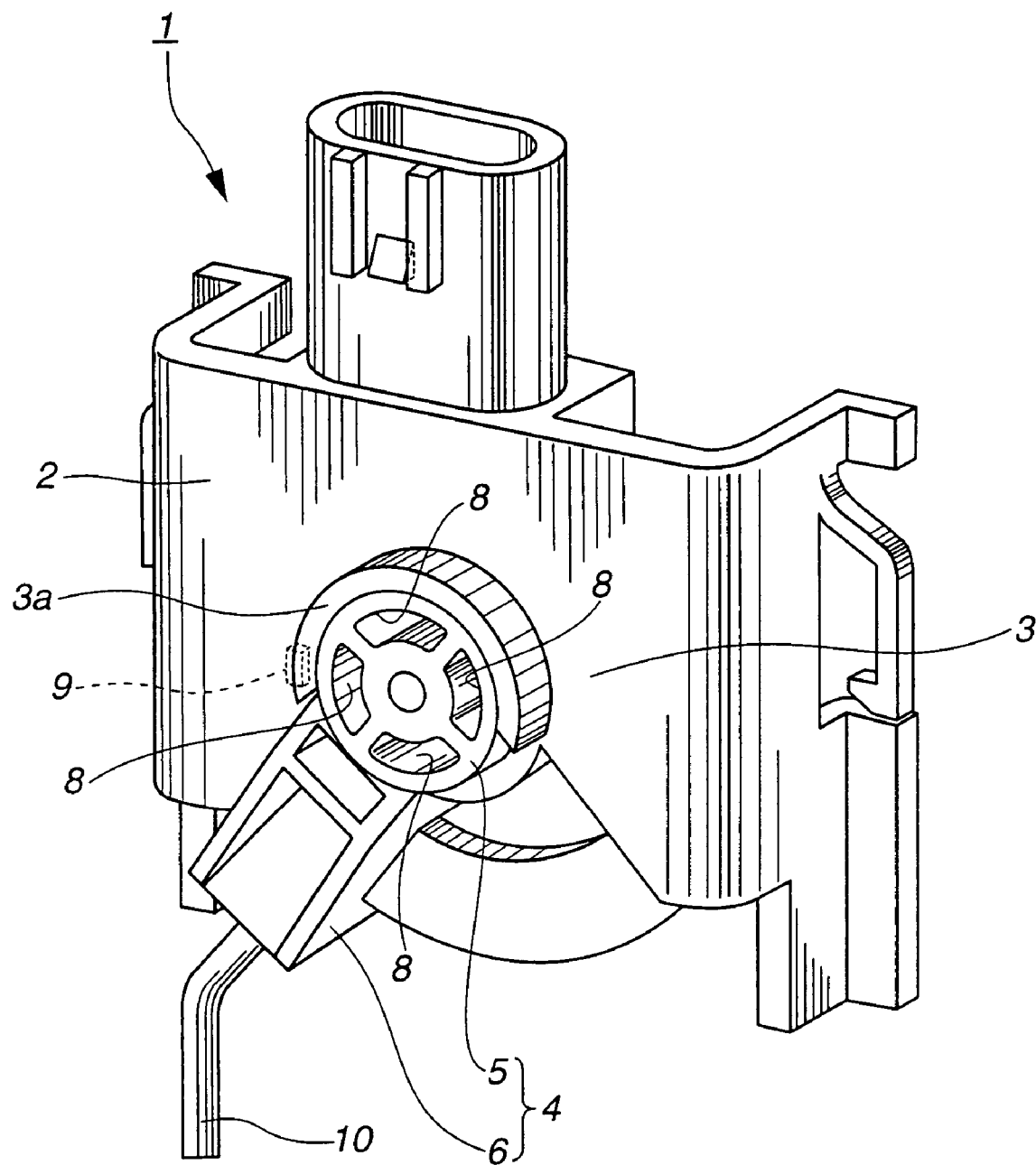
FIG. 1 is a perspective view showing a liquid level sensing apparatus according to an embodiment of the present invention.
Figure 2:
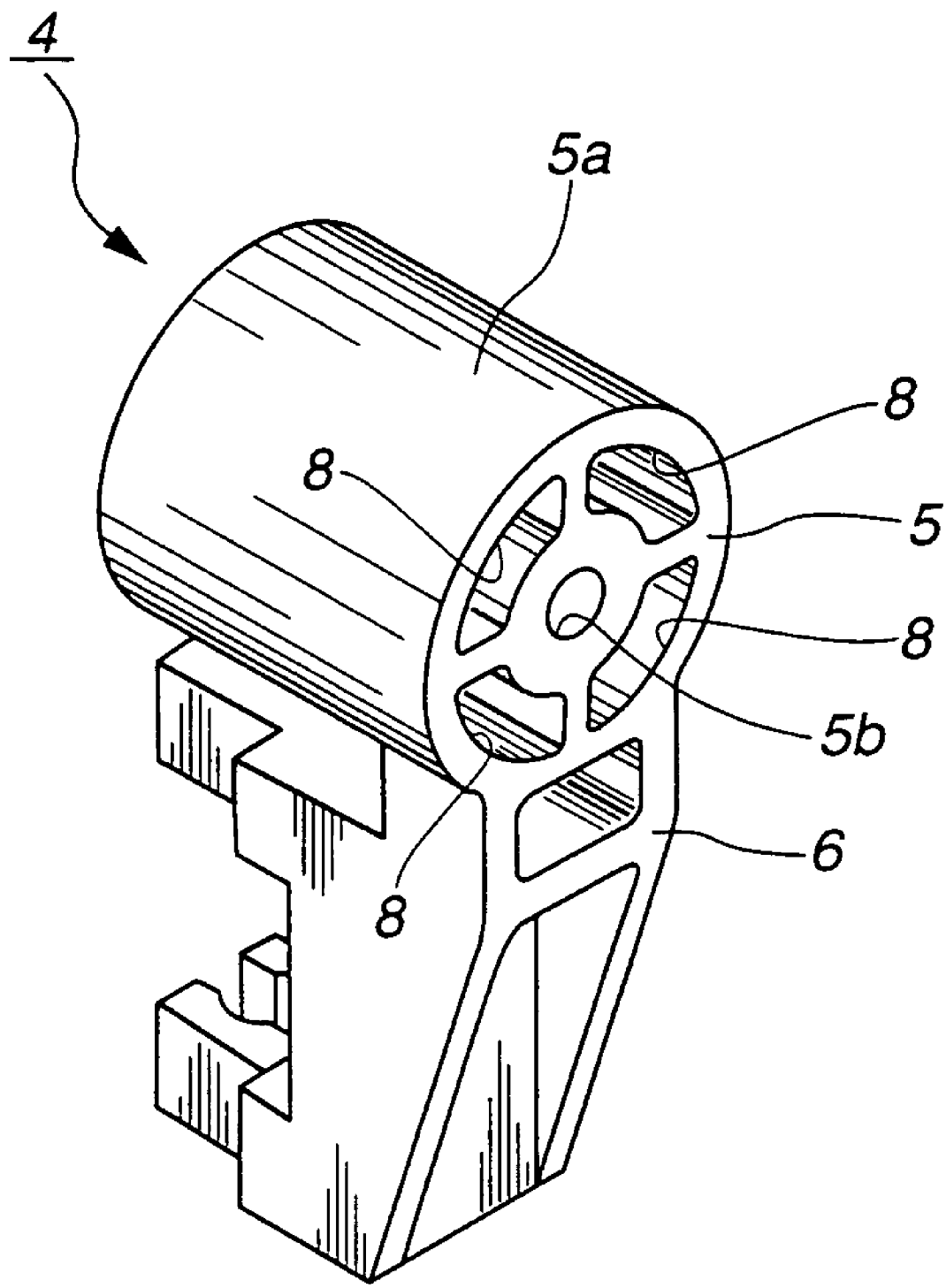
FIG. 2 is a perspective view showing a rotating part of the liquid level sensing apparatus of FIG. 1.
Figure 3:
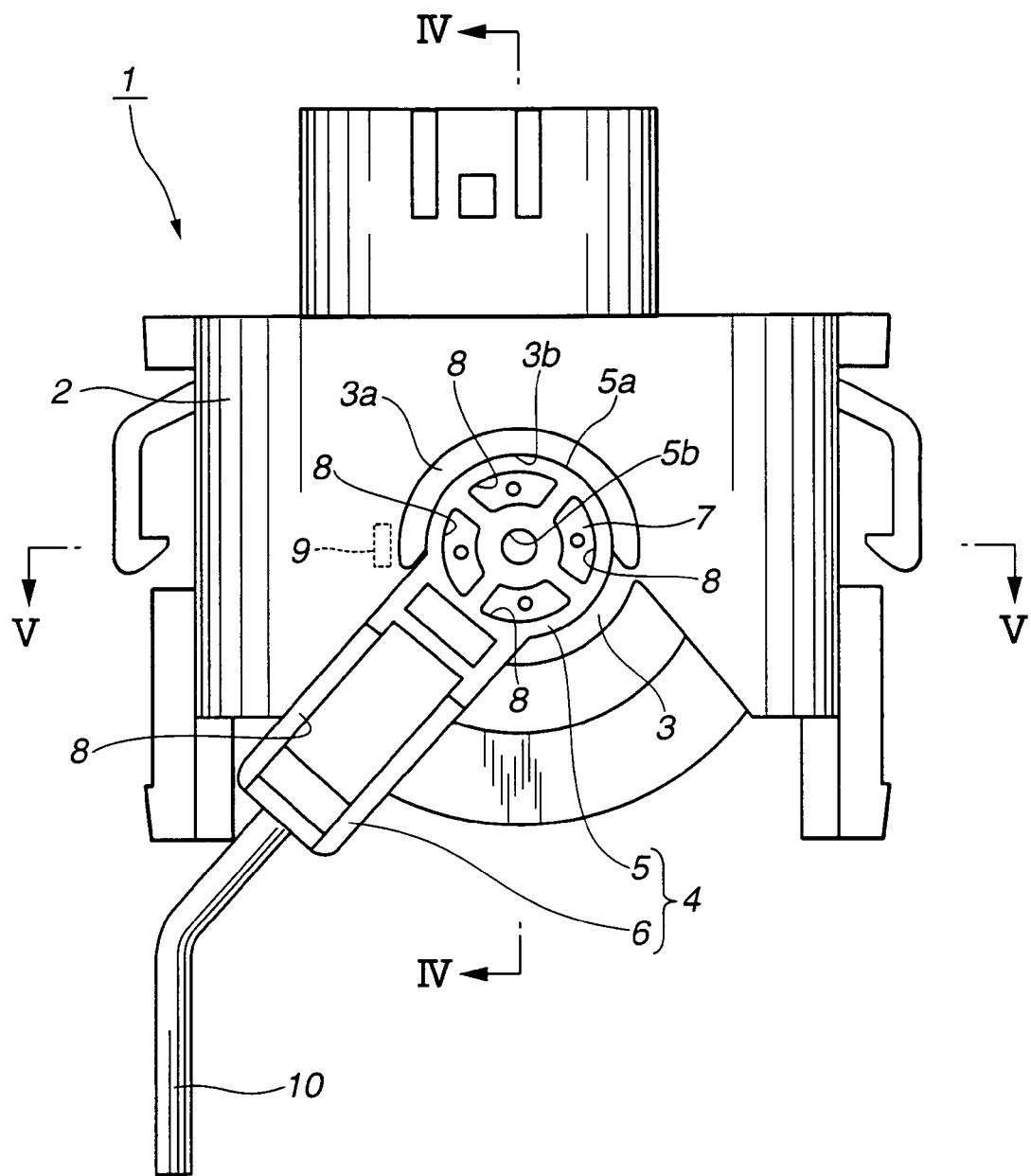
FIG. 3 is a front view showing the liquid level sensing apparatus of FIG. 1.
Figure 4:
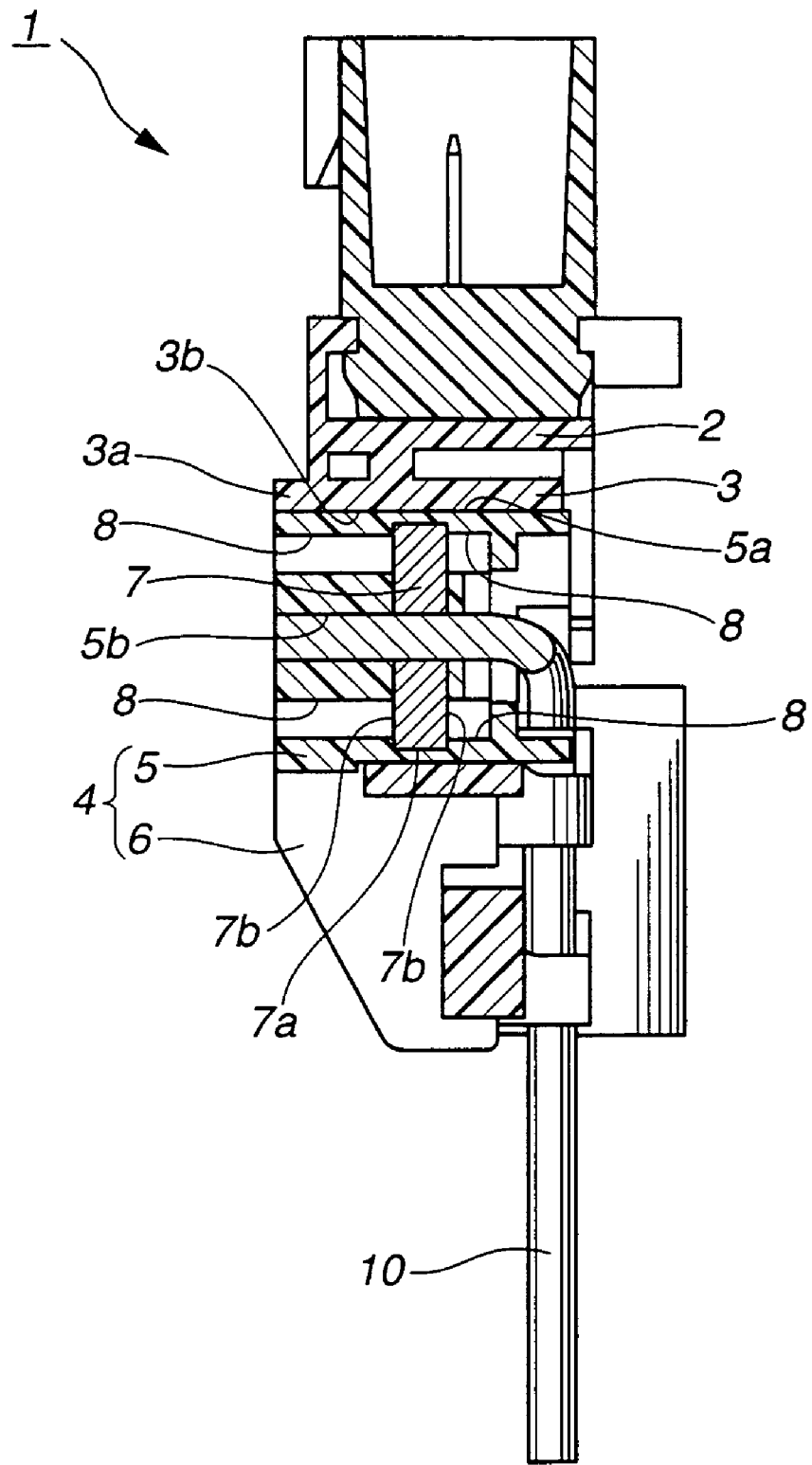
FIG. 4 is a sectional view taken along a line IV—IV in FIG. 3.
Figure 5:
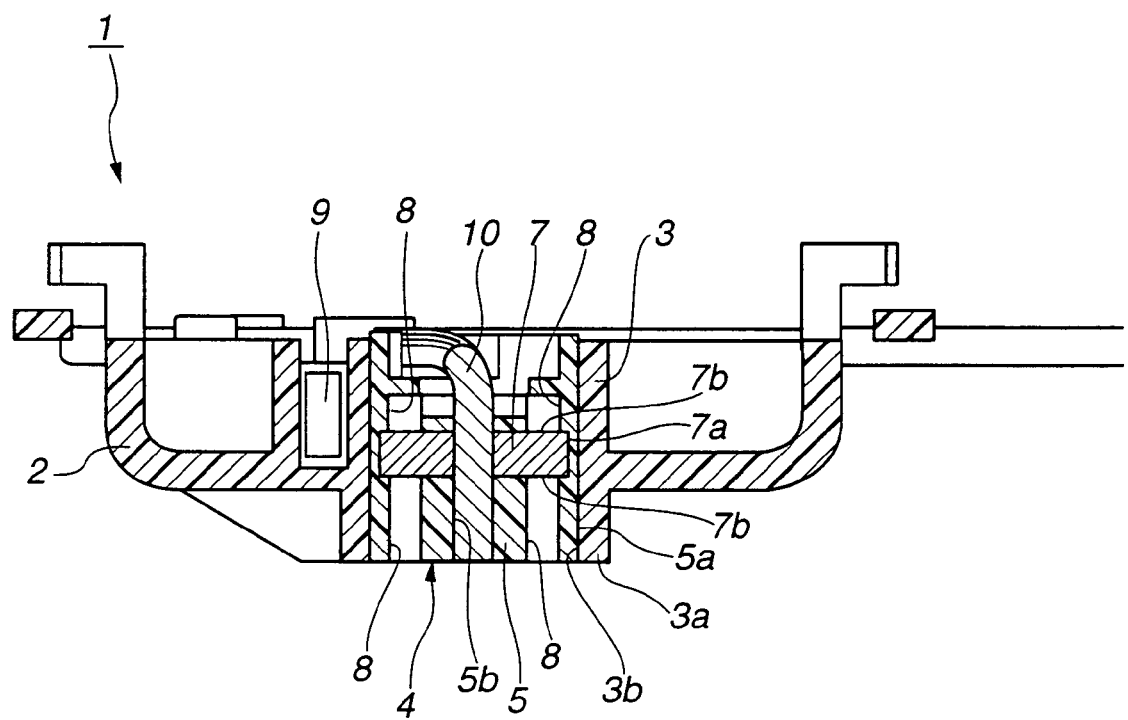
FIG. 5 is a sectional view taken along a line V—V in FIG. 3.

FIG. 1 is a perspective view showing a liquid level sensing apparatus 1 according to an embodiment of the present invention. FIG. 2 is a perspective view showing a rotating part 4 of the liquid level sensing apparatus 1 of FIG. 1. FIG. 3 is a front view showing the liquid level sensing apparatus 1 of FIG. 1. FIG. 4 is a sectional view taken along a line IV—IV in FIG. 3. FIG. 5 is a sectional view taken along a line V—V in FIG. 3. The liquid level sensing apparatus 1 includes a fixed housing 2, the rotating part 4, a magnet 7, a hall element 9, and an arm 10. The housing 2 is arranged to be fixed to an interior surface of a fuel tank in an assembled state. The housing 2 includes a bearing portion 3. The bearing portion 3 includes a semicylindrical arc portion 3a opening downward and projecting laterally from a front side of the bearing portion 3. Both ends of the semicylindrical arc portion 3a restrict a rotation range or angle of the arm 10. The bearing portion 3 is formed with an inner circumferential surface forming a sliding surface 3b on which the rotating part 4 is supported rotatably.

The rotating part 4 includes a rotation center portion 5 having a substantially cylindrical form, and an arm supporting portion 6 extending from the rotation center portion 5 in one radial direction. The rotation center portion 5 is formed with an outer circumferential surface forming a sliding surface 5a opposing the sliding surface 3b. The rotation center portion 5 includes an arm fixing hole 5b at a center of rotation. The arm 10 includes a base portion pressed in the arm fixing hole 5b. The magnet 7 has a cylindrical tube form, and is fixed inside the rotation center portion 5 around the center of rotation of the rotating part 4. Thus, the center of the cylindrical tube form of the magnet 7 coincides with the center of rotation of the rotating part 4. Therefore, the magnet 7 is arranged to rotate with the rotating part 4 in a same rotation arc around the center of rotation. The magnet 7 is polarized or magnetized in radial directions of the cylindrical tube form into two poles, north and south poles, on opposite sides of a boundary represented by a rotation angle of 180°. Thus, polarization or magnetization directions of the magnet 7 are the radial directions of the cylindrical tube form.

The cylindrical tube form of the magnet 7 is composed of a cylindrical surface or first magnet surface 7a forming an outer circumferential surface of the magnet 7, and side surfaces or second magnet surfaces 7b extending radially inward from both edges of the cylindrical surface 7a. The rotating part 4 is formed with exposure holes 8 exposing the front and back side surfaces 7b of the magnet 7 respectively from both front and back sides of the rotating part 4. On each side, four of the exposure holes 8 are arranged at regular intervals around an outer circumference of the arm fixing hole 5b, as shown in FIGS. 2~5. Each of the exposure holes 8 is arranged to expose a part of the side surface 7b spaced radially inward from one of the edges of the cylindrical surface 7a, and expose the part of the side surface 7b in a direction perpendicular to the magnetization directions, i.e., the radial directions, of the magnet 7. Each of the exposure holes 8 is so formed as to have a depth from the sides of the rotating part 4.

The arm 10 extends downward from the rotating part 4 via the arm supporting portion 6. Thus, the arm 10 includes the above-mentioned base portion, and an end portion extending downward and arranged to support a float floating on a liquid level in the fuel tank. In this embodiment, at least the rotating part 4 and the arm 10 form a rotating member arranged to rotate the magnet 7 in accordance with the liquid level.

The hall element 9, which is a magnetoelectric transducer element, is fixed at a position outside the bearing portion 3 of the housing 2. Specifically, the hall element 9 is positioned opposite the cylindrical surface 7a forming the outer circumferential surface of the magnet 7. The hall element 9 is arranged to sense an intensity of a magnetic field in a predetermined direction. Specifically, the hall element 9 is arranged to sense an intensity of a magnetic field in the predetermined direction which is produced by the magnet 7, and converts the intensity of the magnetic field to an electric signal.

When the float moves up and down in accordance with the liquid level in the fuel tank, the movement of the float causes the arm 10 to rotate together with the rotating part 4. Thereby, the magnet 7 rotates with the rotating part 4, and therefore changes directions of the magnetic field produced by the magnet 7. In accordance with the changed directions of the magnetic field, the intensity of the magnetic field sensed by the hall element 9 is changed, and the hall element 9 outputs an electric signal in accordance with the changed intensity of the magnetic field. Thus, the liquid level sensing apparatus 1 obtains from the hall element 9 the electric signal in accordance with changes in the liquid level.

In the fuel tank, magnetic foreign matter represented by magnetic contamination is dispersed and suspended as by flowing with a discharge jet of a fuel pump. The magnetic contamination dispersed and suspended around the liquid level sensing apparatus 1 is attracted and trapped positively to the exposed part of the side surface 7b via the exposure holes 8 of the rotating part 4. The exposed part of the side surface 7b attracting and trapping the magnetic contamination does not influence a magnetic circuit of the hall element 9 positioned opposite the cylindrical surface 7a. As described above, the exposed part of the side surface 7b is spaced radially inward from the cylindrical surface 7a, and is exposed in the direction perpendicular to the magnetization directions of the magnet 7. The thus trapped magnetic contamination is prevented from entering into parts of the liquid level sensing apparatus 1 other than the exposed part of the side surface 7b. Especially, the magnetic contamination is prevented from entering in between the sliding surfaces 5a and 3b of the rotating part 4 and the bearing portion 3. Therefore, the liquid level sensing apparatus 1 of this embodiment can prevent the magnetic foreign matter from causing a deterioration of detection accuracy and a locking of the rotating part 4.

In this embodiment, since each of the exposure holes 8 has the depth, the magnetic contamination attracted by the magnet 7 can be held in the exposure holes 8. Thus, the trapped magnetic contamination is effectively prevented from entering into other parts of the liquid level sensing apparatus 1 due to vibrations and so forth.

In this embodiment, since the exposure holes 8 are provided for both front and back side surfaces 7b of the magnet 7, the magnetic contamination can be attracted to large areas on both sides of the magnet 7. Therefore, the liquid level sensing apparatus 1 of this embodiment can effectively prevent the magnetic contamination from causing the deterioration of the detection accuracy and the locking of the rotating part 4. Besides, the present invention is also effective when the exposure holes 8 are provided for one of the front and back side surfaces 7b of the magnet 7.

In this embodiment, the magnetoelectric transducer element, formed by the hall element 9, can sense the intensity of the magnetic field with high accuracy. Besides, the magnetoelectric transducer element may be formed by other elements which can sense the intensity of the magnetic field produced by the magnet 7.

Besides, the present invention is applicable to variations as described hereinbelow. In the variations, the rotation sensor can achieve substantially the same functions, effects and advantages as in the above-described embodiment.

In the above-described embodiment, each of the exposure holes 8 is arranged to expose the part of the side surface 7b spaced radially inward from the cylindrical surface 7a and facing in the direction perpendicular to the magnetization directions of the magnet 7. However, not limited to this embodiment, the exposure holes 8 may be formed at various positions as long as the exposure holes 8 expose parts of surfaces of the magnet 7 which are located out of the magnetic circuit subjected to the magnetic detection of the hall element 9, and thus do not constitute the magnetic circuit.

This application is based on a prior Japanese Patent Application No. 2004-023316 filed on Jan. 30, 2004. The entire contents of this Japanese Patent Application No. 2004-023316 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A liquid level sensing apparatus comprising:
  a housing including a bearing portion;
  a magnet producing a magnetic field;
  a magnetoelectric transducer element fixed to the housing and arranged to perform a magnetic detection to convert an intensity of the magnetic field to an electric signal; and
  a rotating part supported rotatably on the bearing portion, fixed with an arm arranged to rotate in accordance with a liquid level, housing the magnet, and formed with an exposure hole exposing a surface of the magnet, the surface being located out of a magnetic circuit subjected to the magnetic detection of the magnetoelectric transducer element.

2. The liquid level sensing apparatus as claimed in claim 1, wherein the magnet is formed in a cylindrical form including an outer cylindrical surface and side surfaces extending radially inward from both edges of the outer cylindrical surface, and is polarized in a radial direction of the cylindrical form; the magnetoelectric transducer element is positioned opposite the outer cylindrical surface; and the surface of the magnet exposed by the exposure hole is a part of the side surfaces, the part being spaced radially inward from one of the edges of the cylindrical surface and facing in a direction perpendicular to the radial direction.

3. The liquid level sensing apparatus as claimed in claim 1, wherein the exposure hole is so formed as to have a depth from a surface of the rotating part.

4. The liquid level sensing apparatus as claimed in claim 1, wherein the rotating part is formed with a plurality of the exposure holes exposing both side surfaces of the magnet, the side surfaces being located out of the magnetic circuit.

5. The liquid level sensing apparatus as claimed in claim 1, wherein the magnetoelectric transducer element is a hall element.

6. A liquid level sensing apparatus comprising:
  a housing including a bearing portion;
  a magnet including a first magnet surface extending in a first direction and a second magnet surface extending in a second direction crossing the first direction;
  a magnetoelectric transducer element fixed to the housing, and located at a position confronting the first magnet surface of the magnet to perform magnetic detection to convert an intensity of a magnetic field produced by the magnet, to an electric signal; and
  a rotating member arranged to rotate the magnet in accordance with a liquid level, the rotating member being supported rotatably by the bearing portion of the housing, and the rotating member including a wall portion formed with an exposure hole exposing a region of the second magnet surface of the magnet.

7. The liquid level sensing apparatus as claimed in claim 6, wherein the exposure hole of the rotating member extends in the first direction through the wall portion to the second magnet surface extending in the second direction which is perpendicular to the first direction.

8. The liquid level sensing apparatus as claimed in claim 6, wherein the magnet is a radially magnetized cylindrical magnet having an outer cylindrical surface and two side surfaces bounding the cylindrical surface, the first magnet surface of the magnet being the outer cylindrical surface and the second magnet surface of the magnet being one of the side surfaces; the magnetoelectric transducer element confronts the outer cylindrical surface of the magnet; and the wall portion of the rotating member conceals a peripheral region of the second surface; and the exposure hole extends axially to the second magnetic surface and exposes the region of the second magnet surface surrounded by the peripheral region of the second magnet surface which is concealed by the wall portion of the rotating member.

9. The liquid level sensing apparatus as claimed in claim 8, wherein the outer cylindrical surface of the magnet is buried in the rotating member and concealed by the rotating member.

* * * * *